United States Patent
Murata (10) Patent No.: US 7,268,912 B2
(45) Date of Patent: Sep. 11, 2007

(54) RENDERING PROCESSING APPARATUS, RENDERING PROCESSING METHOD, COMPUTER-READABLE MEMORY MEDIUM, AND PROGRAM

(75) Inventor: Masahiko Murata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 919 days.

(21) Appl. No.: 10/364,518

(22) Filed: Feb. 12, 2003

(65) Prior Publication Data

US 2004/0036894 A1    Feb. 26, 2004

(30) Foreign Application Priority Data

Feb. 22, 2002  (JP) ............... 2002-045673

(51) Int. Cl.
    H04N 1/387   (2006.01)
    G06F 3/12    (2006.01)
(52) U.S. Cl. .............. 358/1.5; 358/1.6; 358/1.16
(58) Field of Classification Search .......... 358/1.5, 358/1.6, 1.16; 382/297
    See application file for complete search history.

(56) References Cited

U.S. PATENT DOCUMENTS

| 4,703,515 | A | * | 10/1987 | Baroody, Jr. .......... 382/297 |
| 5,111,192 | A | * | 5/1992 | Kadakia .......... 345/658 |
| 5,911,147 | A | | 6/1999 | Onodera et al. .......... 711/5 |
| 5,960,165 | A | * | 9/1999 | Kakuno et al. .......... 358/1.12 |
| 6,208,429 | B1 | * | 3/2001 | Anderson .......... 358/1.18 |
| 6,628,289 | B1 | | 9/2003 | Murata .......... 345/505 |
| 2002/0080204 | A1 | | 6/2002 | Murata .......... 347/15 |

* cited by examiner

Primary Examiner—Kimberly A. Williams
(74) Attorney, Agent, or Firm—Fitzpatrick, Cella, Harper & Scinto (57) ABSTRACT

Band rendering processing time in the case where the raster scanning direction of inputted output information and that of a print mechanism are different can be remarkably reduced, and rendering processing efficiency of each page is improved. To expect the further improvement of throughput, a display list to render objects into a band memory is formed on the basis of the inputted output information. A bit map image is rendered into the band memory in accordance with the display list. If it is determined that the raster scanning direction of the inputted output information and that of the print mechanism are different, a rotating process is executed to the bit map image rendered in a rendering step so as to be matched with the raster scanning direction of the print mechanism and the rotated data is transferred to the print mechanism.

13 Claims, 10 Drawing Sheets

MEMORY MEDIUM SUCH AS
FD/CD-ROM OR THE LIKE

| DIRECTORY INFORMATION |
|---|
| 1ST DATA PROCESSING PROGRAM PROGRAM CODE GROUP CORRESPONDING TO STEPS IN THE FLOWCHART SHOWN IN FIG. 5 |
| |

MEMORY MAP IN MEMORY MEDIUM

RENDERING PROCESSING APPARATUS, RENDERING PROCESSING METHOD, COMPUTER-READABLE MEMORY MEDIUM, AND PROGRAM

BACKGROUND OF THE INVENTION

1. Field of the Invention

The invention relates to a rendering processing apparatus, a rendering processing method, a computer-readable memory medium, and a program, in which output information that is inputted is analyzed, a bit map image of each page is rendered in a band memory, and the rendered bit map image is outputted to a print mechanism.

2. Related Background Art

Hitherto, in such a kind of printing apparatus, a memory in which a bit map image is rendered has been defined in accordance with a raster scanning direction of the printing apparatus.

Figure 8:
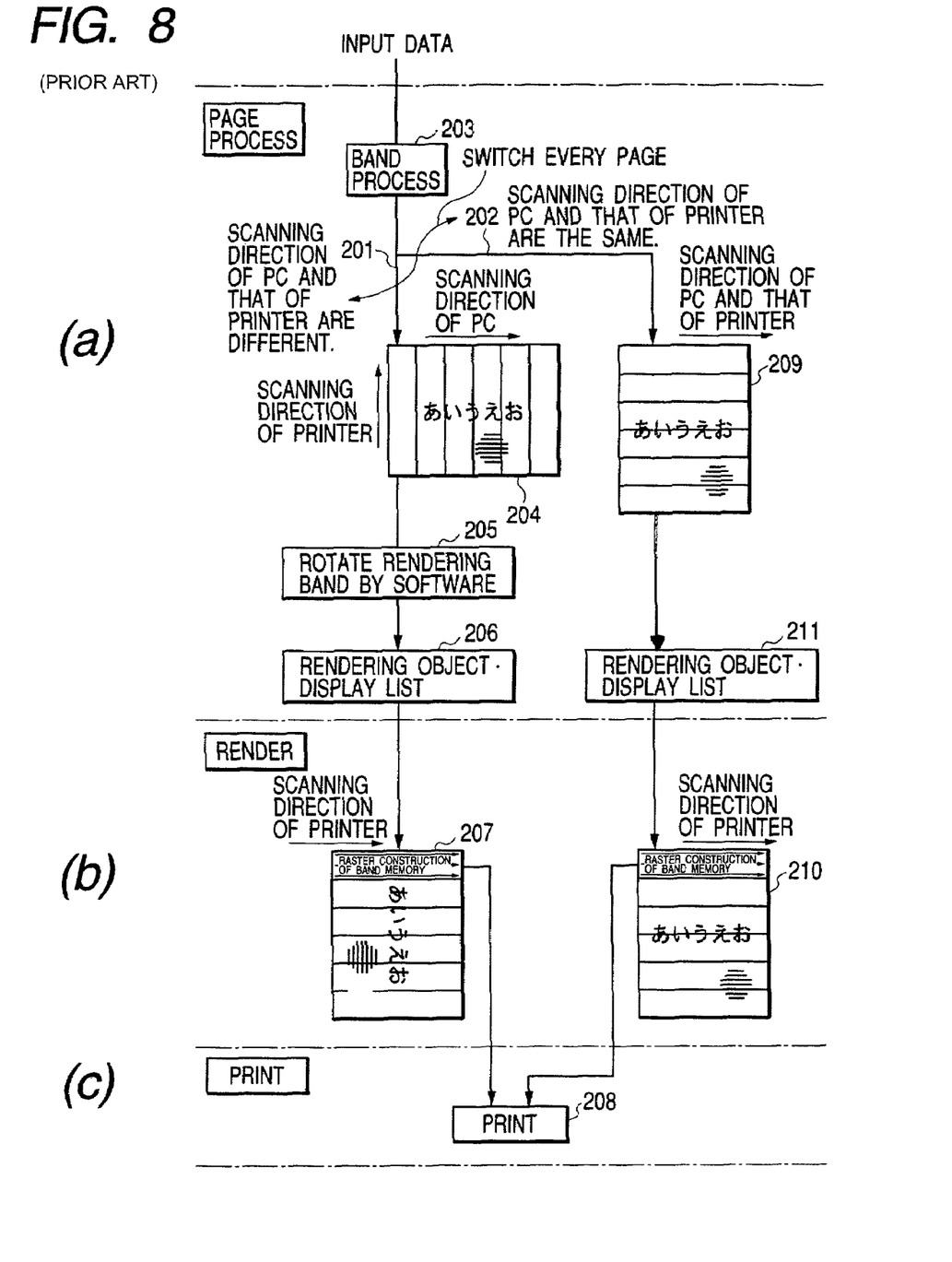
FIG. 8 is a diagram for explaining a print data processing state in a conventional printer.

FIG. 8 is a diagram for explaining a print data processing state in the conventional printing apparatus. A portion (a) corresponds to a page processing phase, a portion (b) corresponds to a rendering processing phase, and a portion (c) corresponds to a print processing phase. Reference numerals 201 to 210 denote processing steps, respectively.

In FIG. 8, the data processes in steps 201, 204, 205, 206, 207, and 208 correspond to the case where a raster direction upon editing in an application program on a host computer (not shown) and a raster direction of a printer (not shown) are different, and the data processes in steps 202, 209, 211, 210, and 208 correspond to the case where the raster direction upon editing in the application program on the host computer and the raster direction of the printer are the same and properly switched page by page. Print data inputted from the host computer is divided into bands every page data in step 203. When the raster direction upon editing and that of the printer are different, the processing routine advances to step 201. In step 204, the band is divided in accordance with a printing direction upon printing. At this time, it is necessary to rotate each object data in order to render and a rotating process by software is executed in step 205.

On the basis of the rotated object data, a rendering object and a display list are formed on a band unit basis in step 206. A bit map image is rendered on a band unit basis on the basis of them in step 207. Rendered band data is printed in step 208.

If the raster direction upon editing and that of the printer are the same, the band is similarly divided in accordance with the printing direction upon printing in step 209. A display list is formed on the basis of the original object data in step 211. On the basis of it, the rendering is performed on a band unit basis in step 210. The print data is printed in step 208.

As described above, in the conventional apparatus, the band division upon printing is executed in a paper conveying direction of the printer and page edit such as rotation or the like is preliminarily executed so that the scanning direction upon band printing also becomes constant, its result is rendered, and a printing process is executed.

Figure 9:
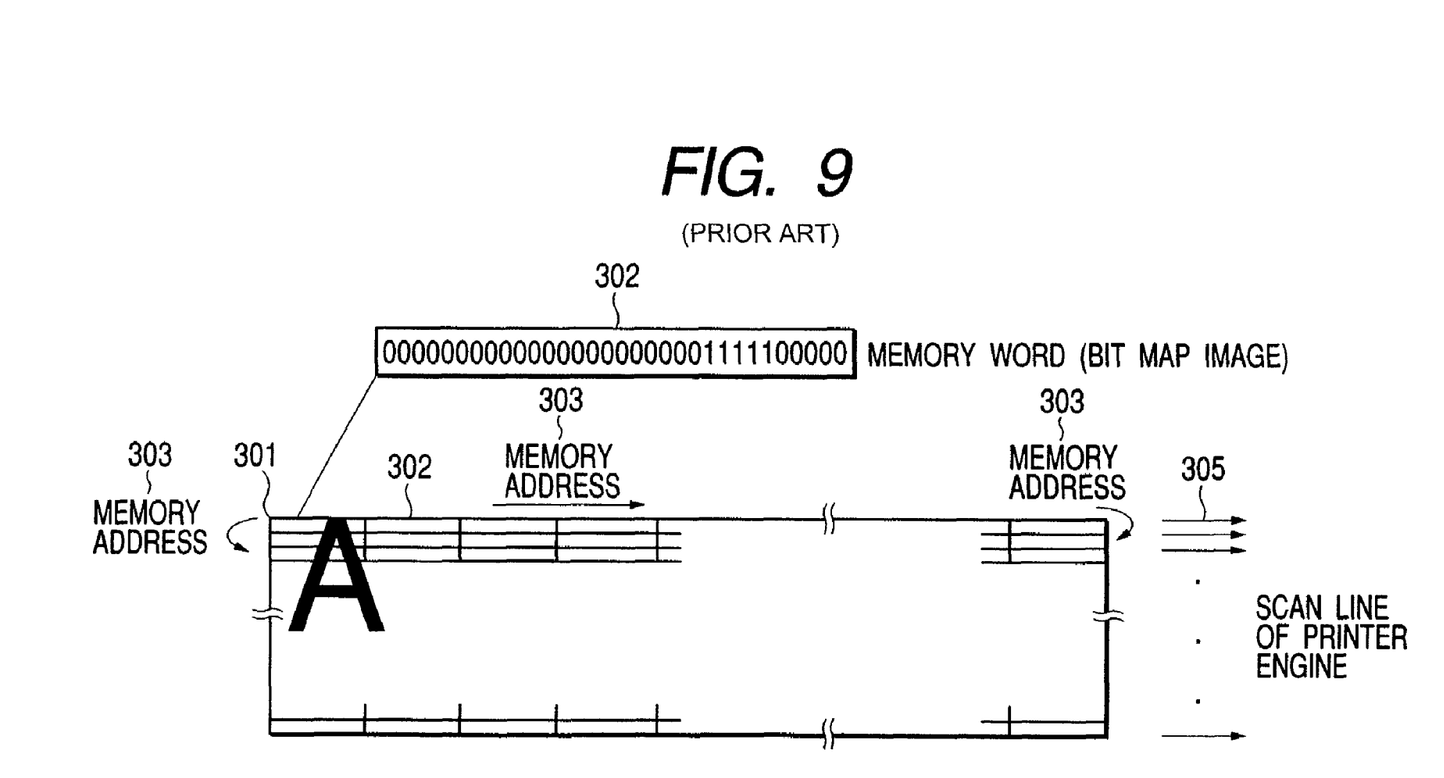
FIG. 9 is a diagram showing a relation between a band memory and a raster scan in the conventional printer.

FIG. 9 is a diagram showing a relation between a band memory and a raster scan in the conventional printer.

In FIG. 9, reference numeral 301 denotes a band memory, that is, an image memory of one band; 302 one word in the memory; 303 an address array of each word; 304 a data array in one word; and 305 a scan line of a print engine.

As shown in FIG. 9, in the band memory, like a data array 304, memory words as image data defined in a bit map format are arranged in the direction shown by the address array 303, that is, in increasing order of the addresses along the scan line 305 of the print engine, a line returning process is executed at a right edge of an image, and the process is subsequently repeated in a manner similar to the above. An image which is rendered is constructed so that it is rendered as bit map data in a position where it is printed as shown in, for example, "A" in FIG. 9.

However, there is a problem such that when the raster scanning direction and that of the printer are different as in the conventional apparatus as shown in FIG. 8, the rotating process occurs certainly in step 205, so that a rendering speed becomes very low.

Specifically speaking, in the decrease in rendering speed, a relative value is approximately in a range from 1/100 to 1/30 of that in the case where the rotating process is not executed. Such a marked decrease in rendering speed is caused because the construction of the band memory and a format of the data which is outputted by the host computer. Causes of such a speed reduction will be explained hereinbelow with reference to FIG. 10.

Figure 10:
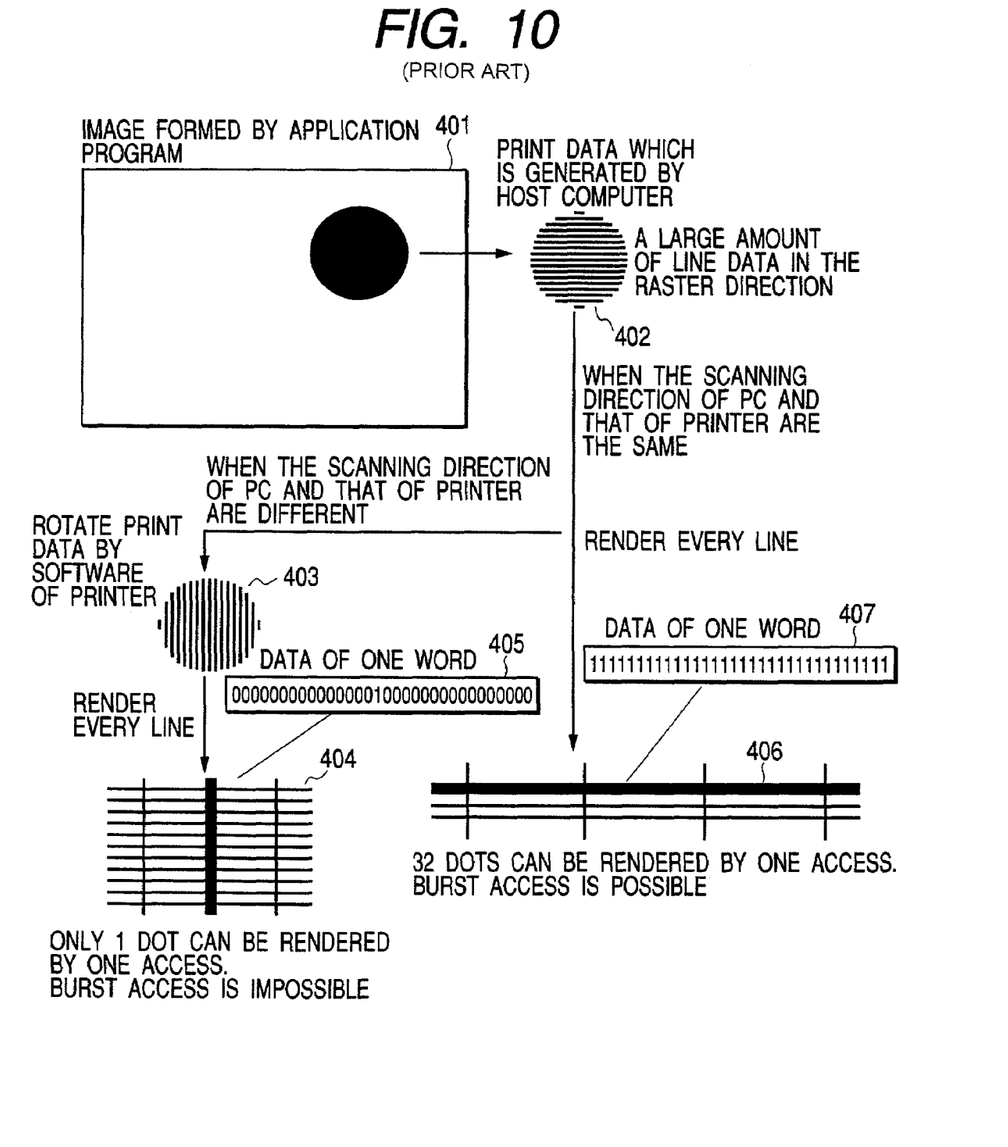
FIG. 10 is a conceptual diagram for explaining an example of a print data process in the conventional printer.

FIG. 10 is a conceptual diagram for explaining an example of a print data process in the conventional printing apparatus.

In FIG. 10, reference numeral 401 denotes image data formed by an application program of a host computer such as a PC or the like. Reference numeral 402 denotes print data which is outputted on the basis of the image data 401. In accordance with the application program, an image as shown in the diagram is divided into image data or lines every scan line and the data is outputted. In such a case, a printer driver or the printer which received the data executes rendering or printing on the basis of the received data.

If the scan line of the PC and that of the printer are different, for example, in the case where an original of the A4 landscape size on the PC is printed by the printer which conveys paper in the A4 portrait direction, all of the print data 402 transmitted from the PC is rotated on a memory in the printer, print data 403 is formed, and rendering is executed in the band memory on the basis of it.

At this time, since the print data 402 is rotated, it becomes a large amount of vertical line data and the vertical line data is sequentially rendered one by one.

Reference numeral 404 denotes a writing state of one vertical line into the band memory. "1" is written only by one dot by one memory access.

In the general construction of the band memory as shown in FIG. 9, the addresses of each word arranged vertically in the writing state 404 are not continuously accessed and a burst access is impossible.

A writing state 406 shows an example in the case where the scan line of the PC and that of the printer are the same, and an image transmitted from the PC becomes a set of lateral lines. In this case, data 407 of one word in the memory can be simultaneously rendered by one memory access with respect to, for example, 32 bits.

Further, in the case of the writing state 406, since the addresses to be rendered are continuous, the burst access is possible.

As mentioned above, there is a problem such that when the scanning direction of the PC and that of the printer are different, the rendering speed decreases markedly as compared with that in the case where the scan lines are the same as shown in FIG. 8.

SUMMARY OF THE INVENTION

The invention is made to solve the foregoing problem. In a rendering processing apparatus in which output information which is inputted is analyzed, a bit map image of each page is rendered into a band memory, and the rendered bit map image is outputted to a print mechanism, it is an object of the invention to provide a rendering processing apparatus, a rendering processing method, a computer-readable memory medium, and a program, in which each page of the inputted output information is sequentially divided on a band unit basis in the direction which is parallel with a raster scanning direction of the print mechanism, thereafter, when whether the raster scanning direction of the inputted output information and the raster scanning direction of the print mechanism are different or the same is discriminated, if it is determined that the raster scanning direction of the inputted output information and that of the print mechanism are different, a rotating process is executed on a band unit basis to the rendered bit map image and the developed bit map image is transferred to the print mechanism, so that band rendering processing time in the case where the raster scanning direction of the inputted output information and that of the print mechanism are different can be remarkably reduced, rendering processing efficiency of each page is improved, and a band rendering processing environment in which the further improvement of throughput can be expected can be freely established.

Figure 1:
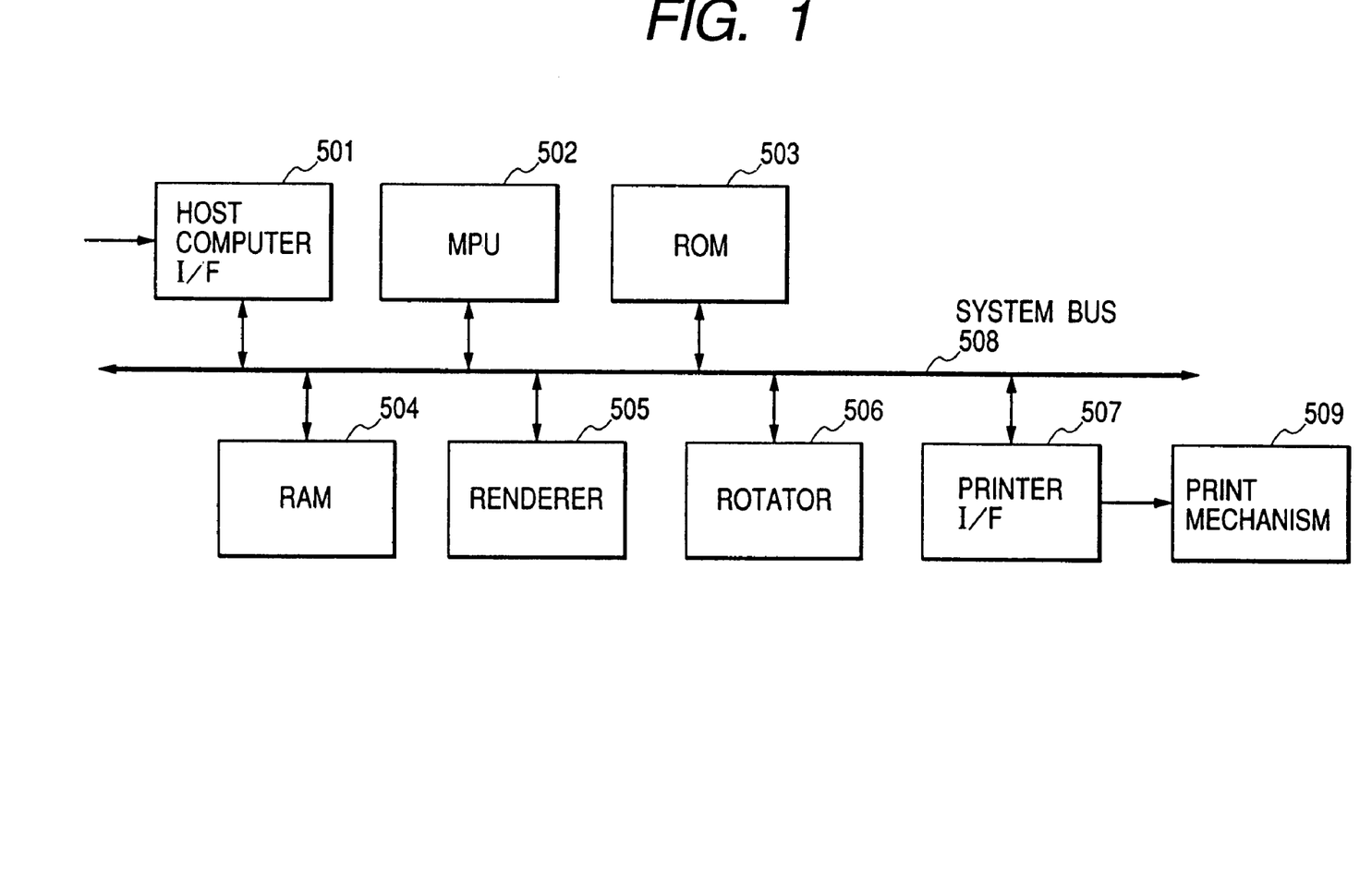
FIG. 1 is a block diagram for explaining an example of a printer control apparatus to which a rendering processing apparatus showing the first embodiment of the invention can be applied.

According to a first aspect of the invention, there is provided a rendering processing apparatus in which output information which is inputted is analyzed, a bit map image of each page is rendered into a band memory, and the rendered bit map image is outputted to a print mechanism, comprising: page processing means (a rendering processing program which is stored into an ROM 503 shown in FIG. 1; corresponds to a construction which is executed by an MPU 502) for sequentially dividing the pages of the inputted output information on a band unit basis in a direction which is parallel with a raster scanning direction of the print mechanism; discriminating means (a rendering processing program which is stored into the ROM 503 shown in FIG. 1; corresponds to a construction which is executed by the MPU 502) for discriminating whether a raster scanning direction of the inputted output information and the raster scanning direction of the print mechanism are different or the same; forming means (a rendering processing program which is stored into the ROM 503 shown in FIG. 1; corresponds to a construction which is executed by the MPU 502) for forming a display list for rendering objects on the basis of the inputted output information; rendering means (a renderer 505 shown in FIG. 1) for rendering each object to the bit map image into the band memory in accordance with the display list; rotating means (a rotator 506 shown in FIG. 1) for executing a rotating process on a band unit basis to the bit map images rendered by the rendering means so as to be matched with the raster scanning direction of the print mechanism; and processing means (a rendering processing program which is stored into the ROM 503 shown in FIG. 1; corresponds to a construction which is executed by the MPU 502) for, if it is determined by the discriminating means that the raster scanning direction of the inputted output information and that of the print mechanism are different, allowing the rotating means to execute the rotating process to the rendered bit map images on a band unit basis and transferring the developed bit map images to the print mechanism.

According to a second aspect of the invention, if it is determined by the discriminating means that the raster scanning direction of the inputted output information and that of the print mechanism are different, the processing means executes the rendering process by the rendering means, the rotating process by the rotating means, and a printing process by the print mechanism in parallel on a band unit basis.

According to a third aspect of the invention, the display list includes information for designating a rendering position of the object data, a rendering logic, and an image process such as rotation, enlargement, or the like.

According to a fourth aspect of the invention, there is provided a rendering processing method comprising: a discriminating step (step S7 shown in FIG. 5) of discriminating whether a raster scanning direction of output information which is inputted and a raster scanning direction of a print mechanism are different or the same; a forming step (step S7 shown in FIG. 5) of forming a display list for rendering objects into a band memory on the basis of the inputted output information; a rendering step (step S7 shown in FIG. 5) of rendering each object to a bit map image into the band memory in accordance with the display list; and a processing step (step S7 shown in FIG. 5) of, if it is determined by the discriminating step that the raster scanning direction of the inputted output information and that of the print mechanism are different, executing a rotating process to the bit map images rendered in the rendering step so as to be matched with the raster scanning direction of the print mechanism and transferring the rotated bit map images to the print mechanism.

According to a fifth aspect of the invention, if it is determined by the discriminating step that the raster scanning direction of the inputted output information and that of the print mechanism are different, in the processing step, the rendering process in the rendering step, the rotating process, and a printing process by the print mechanism are executed in parallel on a band unit basis.

According to a sixth aspect of the invention, the display list includes information for designating a rendering position of the object data, a rendering logic, and an image process such as rotation, enlargement, or the like.

According to a seventh aspect of the invention, a computer-readable memory medium in which a program for realizing the rendering processing method has been stored is provided.

According to an eighth aspect of the invention, a program for realizing the rendering processing method is provided.

DETAILED DESCRIPTION OF THE PREFERRED EMBODIMENTS

First Embodiment

FIG. 1 is a block diagram for explaining an example of a printer control apparatus to which a rendering processing apparatus showing the first embodiment of the invention can be applied.

In FIG. 1, reference numeral 501 denotes a host computer interface for communicating with a host computer (not shown) by a predetermined protocol. Reference numeral 502 denotes a microprocessor (MPU) for executing a page process, a rendering process, and a printing process to print data which is inputted with reference to a control procedure, font data, various control data, and the like which are stored in a ROM 503 and will be explained herein later.

Reference numeral 504 denotes an RAM in which a system area and a work area are assured. This RAM is also dynamically assured as a rendering area to develop print data into a bit map.

Reference numeral 505 denotes a rendering apparatus (renderer) for developing an object based on the print data which is inputted to the rendering area assured on the RAM 504 into a bit map. Reference numeral 506 denotes a rotator for executing a rotating process to rendering data at a high speed by hardware in a rotating processing phase as will be explained herein later.

Reference numeral 507 denotes a printer interface for outputting the rendered rendering data to a print mechanism 509 via a system bus 508.

In the rendering processing apparatus constructed as mentioned above, the host computer I/F 501 is connected to a host computer (not shown) via an interface cable or a network, receives the print data, and stores the print data into an input buffer defined on the RAM 504.

Thus, the MPU 502 reads out the reception data stored in the input buffer, detects a size and a printing direction of print paper in response to a print command, compares the printing direction with a paper conveying direction of the printer, and recognizes a print band and the necessity of rotation of a band image after the rendering. For example, if the paper size is equal to A4 and the printing direction is lateral, that is, A4 landscape and the paper conveying direction of the printer is equal to the A4 portrait feeding direction, a print band is defined as shown in step 104 in FIG. 2, which will be explained herein later, and it is recognized that rotation after completion of the rendering, that is, raster conversion is necessary.

Object data is formed from the print data on a defined band unit basis. A display list as a rendering command for designating the printing position, rendering logic, enlargement, modification, and the like of the object data is formed from the print command.

At this time, the object which extends over the defined band is divided into a plurality of objects at a boundary of the bands and a display list is formed for each of the divided objects. Those display lists or object data are stored into a predetermined area on the RAM 504.

After the display list and the object data of one page are formed, the rendering operation is started in order of the band which is printed.

When the rendering operation is started, the renderer 505 reads out the display list stored in the RAM 504, reads out the object data which is designated by it from the RAM 504, adds a process which is designated by the display list, and generates a bit map image. The generated image data is logically and arithmetically operated with the data on the band memory defined in the RAM 504 and written again into the band memory, and a print image (bit map image) is formed.

If the scanning direction of the data formed by the printer and that of the data formed on the PC are different, the image data formed on the band memory is read out to the rotator 506 at a rotating processing phase, which will be explained herein later. The image data is subjected to raster conversion, that is, the rotating operation so that the scanning direction of the printer and the construction of the bit map image coincide, and the resultant rotated data is stored in a predetermined position on the RAM 504.

If the scanning direction of the data formed by the printer and that of the data formed on the PC are different, the printer I/F 507 outputs the rotated image data and, if the scanning direction of the data formed by the printer and that of the data formed on the PC are the same, the printer I/F 507 reads out the rendered data in the band memory and outputs it to the print mechanism 509 synchronously with the operation of the print mechanism, thereby realizing the printing operation.

Figure 2:
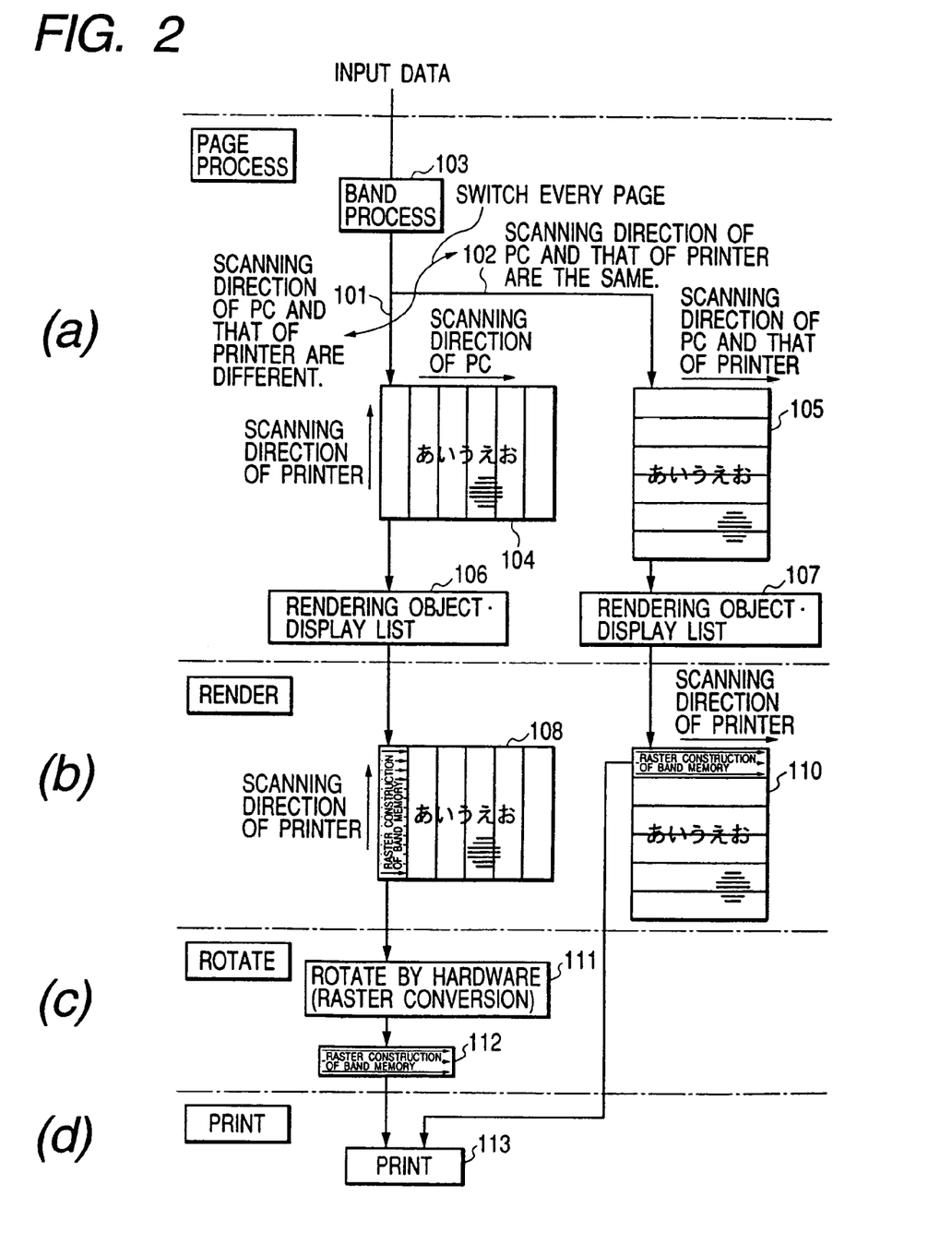
FIG. 2 is a diagram for explaining a print data processing state in the rendering processing apparatus according to the invention.

FIG. 2 is a diagram for explaining a print data processing state in the rendering processing apparatus according to the invention. A portion (a) corresponds to a page processing phase, a portion (b) corresponds to a rendering processing phase, a portion (c) corresponds to a print processing phase, and a portion (d) corresponds to a rotating processing phase, respectively. Reference numerals 101 to 113 denote processing steps, respectively.

First, if the raster direction upon editing in the application program on the host computer and that in the printer are different, step 101 follows. If they are the same, step 102 follows and those raster directions are properly switched page by page.

Data processes in steps 103, 104, 106, 108, 111, 112, and 113 correspond to the case where the raster direction upon editing in the application program on the host computer (not shown) and that in the printer (not shown) are different and the case where those raster directions are properly switched page by page. Data processes in steps 103, 102, 105, 107, 110, and 113 correspond to the case where the raster direction upon editing in the application program on the host computer and that in the printer are the same and the case where those raster directions are properly switched page by page.

In step 103, the inputted print data is divided into bands every page data and if the raster scanning direction upon editing in the host computer and that of the printer are different, step 101 follows. The band is divided in sections that are parallel to the scanning direction of the printer upon printing as shown in step 104.

At this time, in order to render, the data of each print object is divided into bands and the object data of each band is formed as a rendering object display list of the band unit in step 106. On the basis of them, a bit map image is rendered on a band unit basis in step 108.

Since the raster scanning direction of the rendered data is the same as that of the host computer, the data cannot be printed unless the data is in the format according to the raster scan of the printer at the time of printing. Therefore, after the rendering, the rotating process, that is, the raster conversion is executed by the rotator 506 in step 111. In step 112, band image data whose scanning direction coincides with the scanning direction of the printer is obtained.

Subsequently, in step 113, the band image data is transferred to the print mechanism 509 and printed onto recording paper.

If the raster scanning direction upon editing and that of the printer are the same, the band is divided in sections that are parallel, as shown in step 105, to the scanning direction of the printer and a display list is formed on the basis of the object data as it is. On the basis of the display list, the rendering process is executed on a band unit basis in step 110. The data is similarly printed onto the recording paper on the basis of the foregoing processes in step 113.

Figure 3:
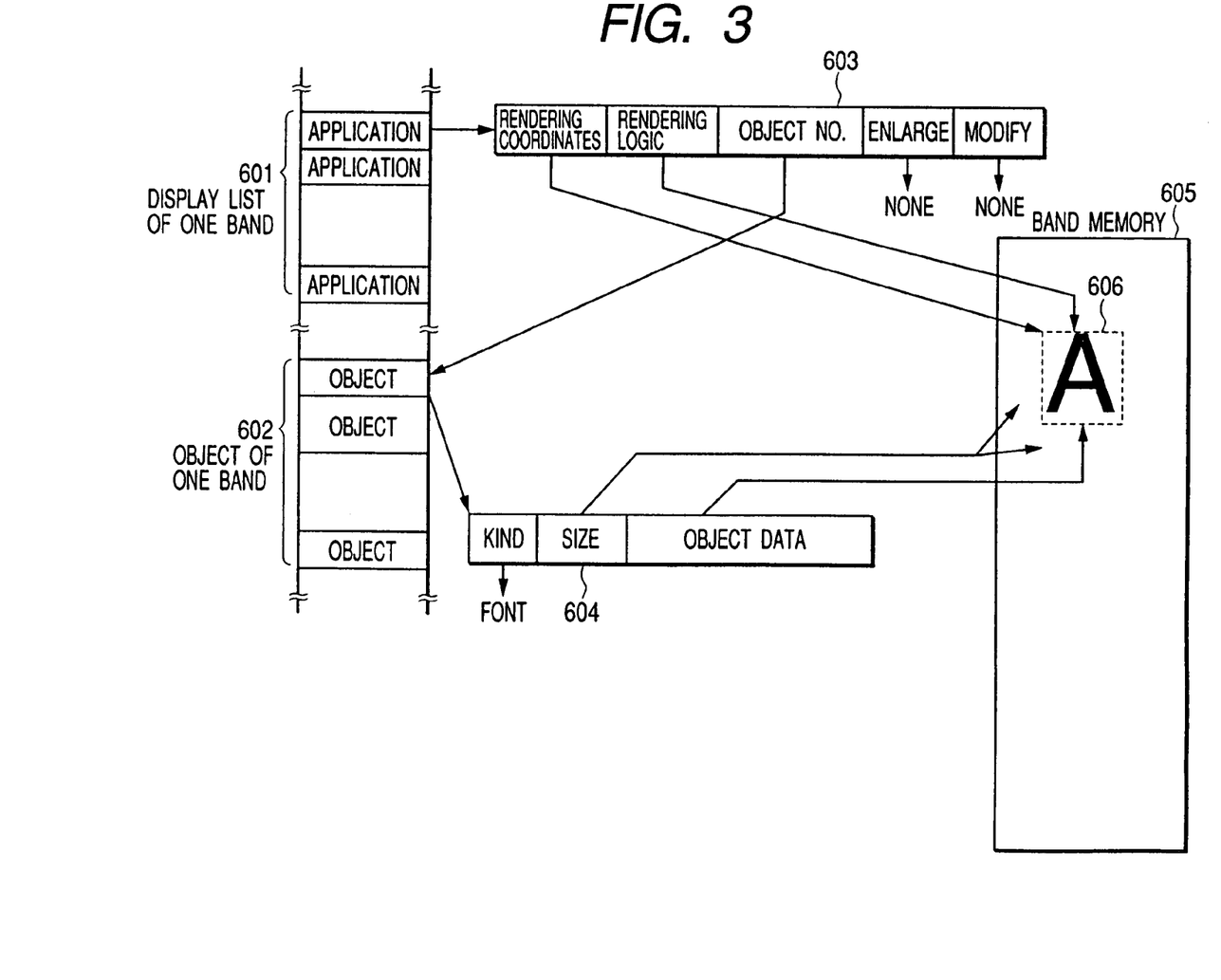
FIG. 3 is a diagram for explaining a rendering processing state in the rendering processing apparatus according to the invention.

FIG. 3 is a diagram for explaining a rendering processing state in the rendering processing apparatus according to the invention and corresponds to relations among the display list, the format of the object data, the rendering operation, and the band memory.

In FIG. 3, reference numeral 601 denotes a display list of one band formed on the RAM 504. Reference numeral 602 denotes object data of one band formed on the RAM 504. Each of the display list and the object data is formed by the MPU 502 on the basis of the print command and the data which are inputted from the host computer.

Reference numeral 603 denotes a format of an application as a rendering command of the objects constructing the display list. This format is constructed by rendering coordinates in the band, a rendering logic, a pointer of the object which is used, and information indicative of designation or the like of the operation such as enlargement, modification, or the like.

Reference numeral 604 denotes a format of the object data. This format is constructed by a type of object, a size of object, and main body data of the object. Reference numeral 605 denotes a band memory which is assured on the RAM 504.

The renderer 505 reads out the applications one by one from the display list 601, reads out the object designated there from the object data 602, and renders the object main body data into the band memory 605 by the rendering logic designated to the coordinates which are designated by the application. The rendering example shown in FIG. 3 corresponds to the case where the type of rendering object data indicates "font".

Figure 4:
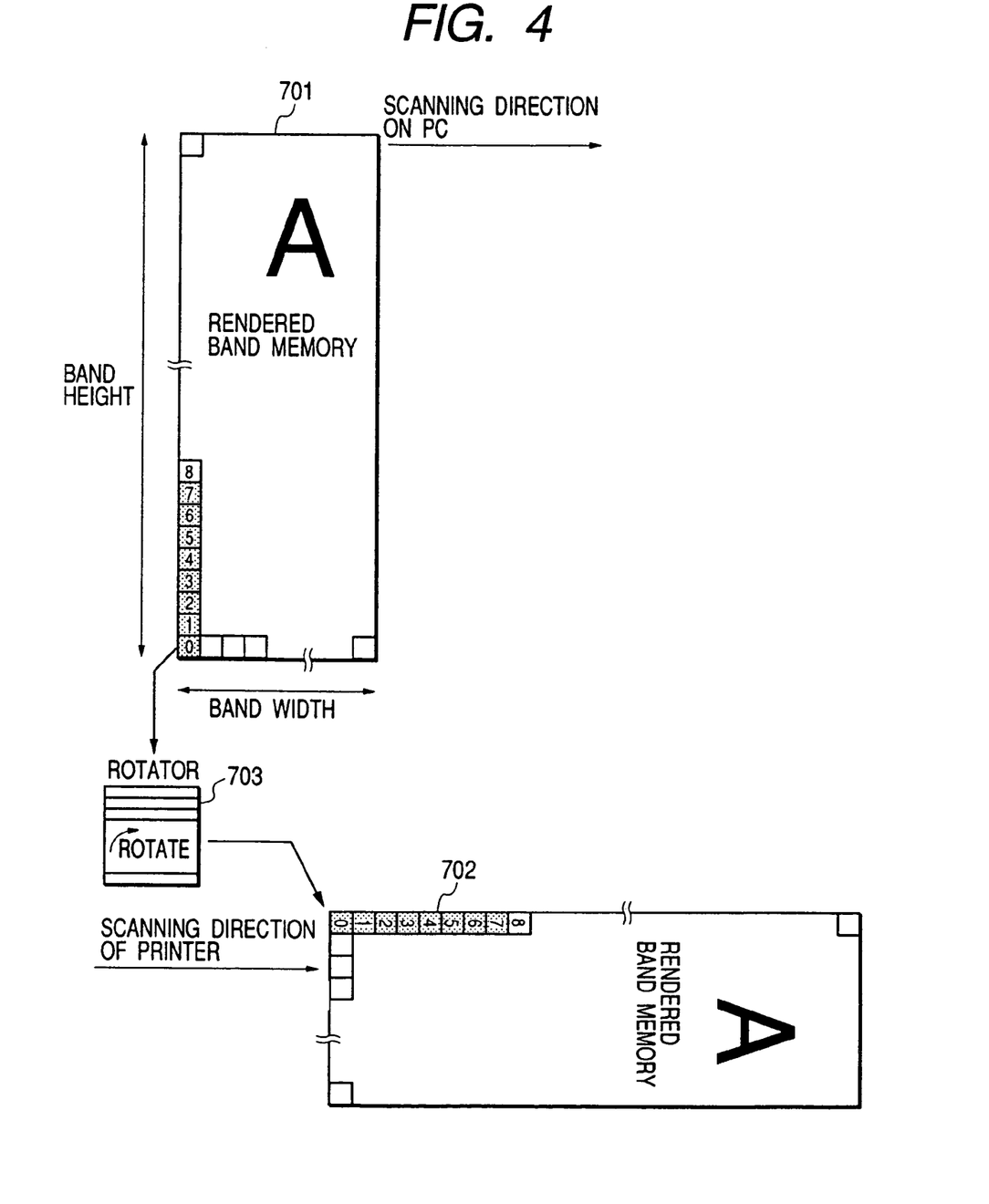
FIG. 4 is a diagram for explaining a rotating process by a rotator shown in FIG. 1.

FIG. 4 is a diagram for explaining a rotating process by the rotator 506 shown in FIG. 1.

In FIG. 4, reference numeral 701 denotes a band image in the band memory rendered at the time when it is edited on the PC; 702 a band image which has been converted in the scanning direction of the print mechanism, that is, rotated; and 703 a rotator.

The example of the rotating process shown in FIG. 4 corresponds to a portion in which the band image data in step 108 shown in FIG. 2 is raster converted in step 111, thereby obtaining rotated band image data in step 112.

The rotator 506 shown in FIG. 1 reads the data of, for example, 32 bits×32 lines as one block and stores it into the rotator 703.in the order in which the print mechanism 509 of the band image 701 defined and rendered at a predetermined position in the RAM 504 reads out the data in order to print, that is, in the order in which the print engine scans. The rotator 506 rotates such rectangular data to the right by 90° in the embodiment and writes the rotated data as a band image 702 into the band memory in which it is printed as an image of 32 bits×32 lines. The above operation is repeated from a block 0 in order of 1, 2, 3, . . . in the diagram. When the operation regarding one line is finished, the line is returned and the whole data of one band is rotated and copied. In this manner, a band image to be printed in which the direction coincides with the scanning direction of the print mechanism 509 is formed.

Figure 5:
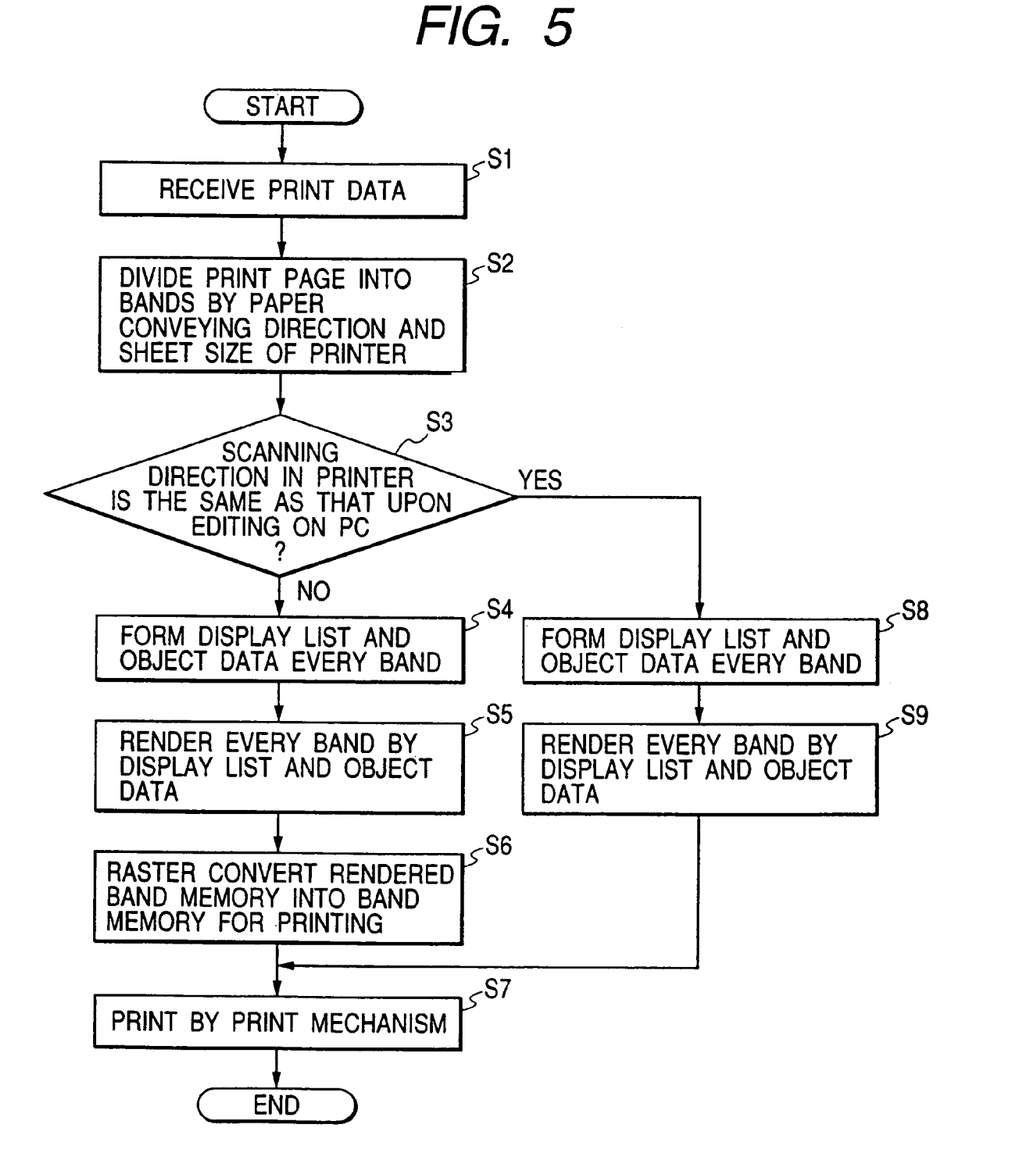
FIG. 5 is a flowchart showing an example of a data processing procedure in the rendering processing apparatus according to the invention.

FIG. 5 is a flowchart showing an example of a data processing procedure in the rendering processing apparatus according to the invention. S1 to S9 denote processing steps which are executed by the MPU 502 shown in FIG. 1.

First, in step S1, the print data is received from the host computer such as a PC or the like. In step S2, the print page is divided into bands in accordance with the printer and its paper conveying direction. In step S3, whether the scanning direction at the time when the host computer such as a PC or the like edits and the scanning direction of the printer coincide or not is discriminated. If it is determined that they coincide, step S8 follows. If it is determined that they do not coincide, the print data is classified every band and a display list and object data are formed every band on the basis of it in step S4. In step S5, rendering is executed by activating the renderer 505 on the basis of the display list and the object data formed in step S5. In step S6, the rendered band memory is rotated into the band memory for printing by the rotator 506, thereby performing raster conversion.

If it is determined in step S3 that the scanning directions coincide, in step S8, the print data is classified every band and a display list and object data are formed every band on the basis of it. In step S9, rendering is executed by activating the formed renderer 505 on the basis of the display list and the object data.

The image data prepared in steps S6 and S9 is sent to the print mechanism 509 via the printer I/F 507 and printed onto the recording paper in step S7.

As described above, according to the embodiment, the rendering is performed in the raster scanning direction upon editing on the PC and if this raster scanning direction and the raster scanning direction of the print mechanism are different, the band image after the rendering is rotated and printed in accordance with the scanning direction of the print mechanism. Thus, the rendering process of the raster image which is generated by the PC or the line data of the raster unit can be executed at a remarkably higher speed as compared with that in the conventional system in which the object is rotated and, thereafter, rendered. Even in the conventional data in which the scanning direction is different and it takes time for the rendering process, the print speed can be remarkably raised. Whole print processing efficiency can be extremely improved and throughput is also improved.

Second Embodiment

Figure 6:
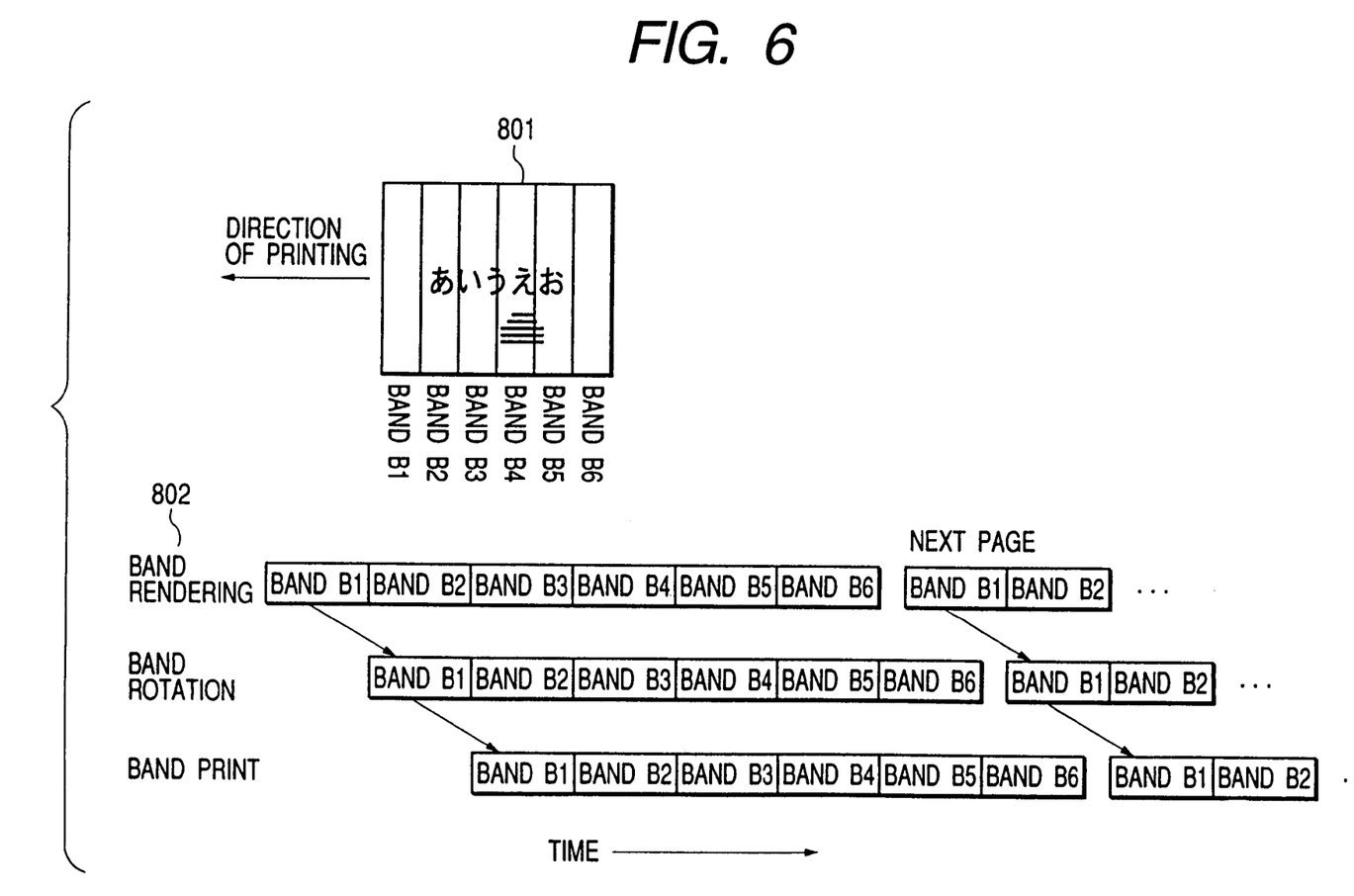
FIG. 6 is a diagram for explaining an example of a rendering processing state in a rendering processing apparatus showing the second embodiment of the invention.

FIG. 6 is a diagram for explaining an example of a rendering processing state in a rendering processing apparatus showing the second embodiment of the invention.

In FIG. 6, reference numeral 801 denotes a band dividing state and 802 indicates a processing phase of each band in time-dependent relations among the rendering processing phase, the rotating processing phase, and the print processing phase.

The example of the rendering process shown in FIG. 6 corresponds to the case where the raster scanning direction upon editing in the host computer and the scanning direction upon printing are different. At this time, the band division is performed like bands B1 to B6 in a manner similar to the first embodiment.

The rendering, rotation, and printing are executed on a band unit basis. In this instance, as shown in the processing phase 802, print time of one band is used as a delimiter and the rendering process, rotating process, and printing process are executed in parallel (parallel processes) in order of the band B1, band B2, band B3, . . . .

It is also possible to execute parallel operations over the pages, thereby enabling a fast print of a higher speed and a larger throughput of the printing to be obtained.

According to each of the foregoing embodiments, as compared with the conventional system in which after the object is rotated, the rendering is performed, the raster image which is generated by the PC or the line data of the raster unit can be rendered at a remarkably higher speed. The print speed of the data which needed long print time hitherto can be extremely raised.

By executing the rendering into the band memory, the raster conversion for rotating the band memory, and the printing of the band image in parallel, the fast printing of a further higher speed and the larger throughput can be obtained.

A construction of data processing programs which can be read out by a print control apparatus to which the rendering processing apparatus according to the invention can be applied will be described hereinbelow with reference to a memory map shown in FIG. 7.

Figure 7:
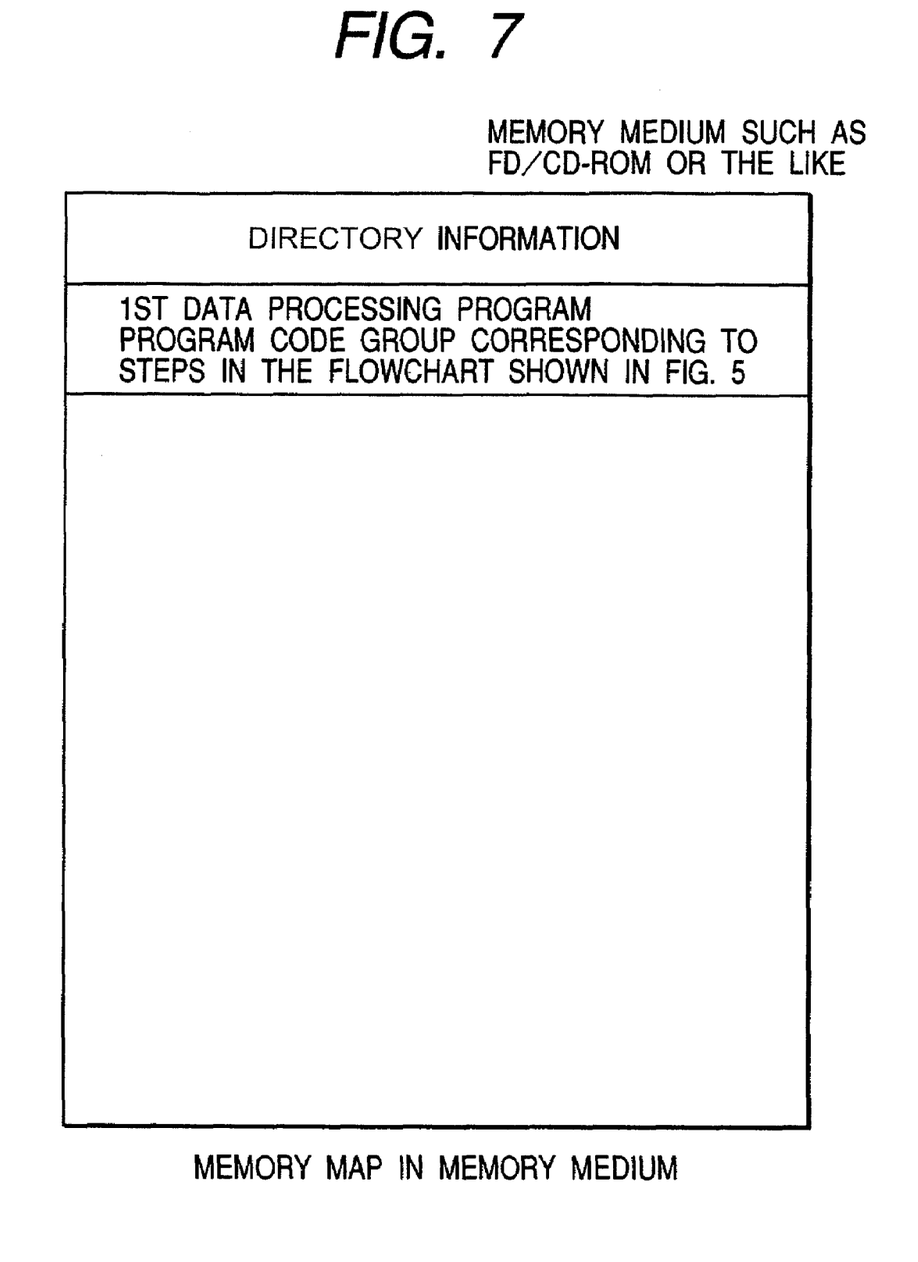
FIG. 7 is a diagram for explaining a memory map in a memory medium for storing various data processing programs which can be read out by a print system to which the rendering processing apparatus according to the invention can be applied.

FIG. 7 is a diagram for explaining the memory map in a memory medium for storing various data processing programs which can be read out by a print system to which the rendering processing apparatus of the invention can be applied.

Although not particularly shown, there is also a case where information to manage a group of programs which are stored into the memory medium, for example, version information, implementors, and the like are also stored, and information which depends on an OS (Operating System) or the like on the program reading side, for example, icons to identify and display the programs or the like are stored.

Further, data depending on the various programs is also managed in the directories. There is also a case where a program to install the various programs into a computer and, if the installing program has been compressed, a program to decompress it and the like are stored.

The functions shown in FIG. 5 in the embodiment can be executed by the host computer in accordance with a program which is installed from an outside. In this case, the invention is also applied to a case where the information group including the programs is supplied to an output apparatus from a memory medium such as CD-ROM, flash memory, FD, or the like or from an external memory medium via a network.

Naturally, the object of the invention is accomplished by a method whereby a memory medium in which program codes of software to realize the functions of the embodiments as mentioned above have been recorded is supplied to a system or an apparatus and a computer (or a CPU or an MPU) of the system or the apparatus reads out and executes the program codes stored in the memory medium.

In this case, the program codes themselves read out from the memory medium realize the novel functions of the invention and the memory medium in which the program codes have been stored constructs the invention.

As a memory medium to supply the program codes, for example, a floppy (registered trademark) disk, a hard disk, an optical disk, a magnetooptic disk, a CD-ROM, a CD-R, a magnetic tape, a non-volatile memory card, an ROM, an EEPROM, or the like can be used.

Naturally, the invention incorporates not only a case where a computer executes the read-out program codes, so that the functions of the embodiments as mentioned above are realized but also a case where an OS (Operating System) or the like which is operating on the computer executes a part or all of actual processes on the basis of instructions of the program codes and the functions of the embodiments as mentioned above are realized by those processes.

Further, naturally, the invention also incorporates a case where the program codes read out from the memory medium are written into a memory provided for a function expanding board inserted in a computer or a function expanding unit connected to a computer and, thereafter, a CPU or the like provided for the function expanding board or the function expanding unit executes a part or all of actual processes on the basis of instructions of the program codes and the functions of the embodiments as mentioned above are realized by those processes.

According to the embodiments of the invention as described above, in the rendering processing apparatus which analyzes the inputted output information, renders the bit map image of each page into the band memory, and outputs the rendered bit map images to the print mechanism, after the pages of the inputted output information are sequentially divided on a band unit basis in the direction which is parallel with the raster scanning direction of the print mechanism, whether the raster scanning direction of the inputted output information and the raster scanning direction of the print mechanism are different or the same is discriminated, and if it is determined that the raster scanning direction of the inputted output information and that of the print mechanism are different, the rotating process is executed to the rendered bit map image on a band unit basis and the developed bit map image is transferred to the print mechanism. Thus, the band rendering processing time in the case where the raster scanning direction of the inputted output information and that of the print mechanism are different can be remarkably reduced and the rendering processing efficiency of each page is improved. There is an effect such that the band rendering processing environment in which the further improvement of the throughput can be expected can be freely established.

What is claimed is:

1. A rendering processing apparatus in which output information which is inputted is analyzed, a display list is formed, a bit map image is rendered into a band memory on the basis of said formed display list, and said rendered bit map image is outputted to a print mechanism, comprising:

page processing means for sequentially dividing pages of the inputted output information on a band unit basis in a direction which is parallel with a raster scanning direction of said print mechanism;

discriminating means for discriminating whether a raster scanning direction of the inputted output information and the raster scanning direction of said print mechanism are different or the same;

forming means for forming a display list for rendering objects on the basis of the inputted output information;

rendering means for rendering each of said objects to the bit map image into said band memory in accordance with said display list;

rotating means for executing a rotating process on a band unit basis to the bit map images so as to be matched with the raster scanning direction of said print mechanism; and processing means for, if it is determined by said discriminating means that the raster scanning direction of the inputted output information and that of said print mechanism are different, allowing, after the bit map images are rendered by said rendering means, said rotating means to execute the rotating process to the rendered bit map images on a band unit basis and transferring the developed bit map images to said print mechanism.

2. An apparatus according to claim 1, wherein if it is determined by said discriminating means that the raster scanning direction of the inputted output information and that of said print mechanism are different, said processing means executes the rendering process by said rendering means, the rotating process by said rotating means, and a printing process by said print mechanism in parallel on a band unit basis.

3. An apparatus according to claim 1, wherein said display list includes information for designating at least one of a rendering position of said object data, a rendering logic, and an image process such as rotation or enlargement.

4. A rendering processing method comprising:
a forming step of forming a display list for rendering objects into a band memory on the basis of output information which is inputted;

a rendering step of rendering each of said objects to a bit map image into a band memory in accordance with said display list;

a discriminating step of discriminating whether a raster scanning direction of the inputted output information and a raster scanning direction of a print mechanism are different or the same; and a processing step of, if it is determined in said discriminating step that the raster scanning direction of the inputted output information and that of said print mechanism are different, executing, after the bit map images are rendered in said rendering step, a rotating process to the rendered bit map images so as to be matched with the raster scanning direction of said print mechanism and transferring the rotated bit map images to said print mechanism.

5. A method according to claim 4, wherein if it is determined in said discriminating step that the raster scanning direction of the inputted output information and that of said print mechanism are different, in said processing step, said rendering process, said rotating process, and a printing process by said print mechanism are executed in parallel on a band unit basis.

6. A method according to claim 4, wherein said display list includes information for designating at least one of a rendering position of said object data, a rendering logic, and an image process such as rotation or enlargement.

7. A computer-readable storage medium storing a computer-executable program, the computer-executable program comprising:
a forming step of forming a display list for rendering objects into a band memory on the basis of output information which is inputted;

a rendering step of rendering each of said objects to a bit map image into a band memory in accordance with said display list;

a discriminating step of discriminating whether a raster scanning direction of the inputted output information and a raster scanning direction of a print mechanism are different or the same; and a processing step of, if it is determined in said discriminating step that the raster scanning direction of the inputted output information and that of said print mechanism are different, executing, after the bit map images are rendered in said rendering step, a rotating process to the rendered bit map images so as to be matched with the raster scanning direction of said print mechanism and transferring the rotated bit map images to said print mechanism.

8. A computer-readable storage medium storing a computer-executable program according to claim 7, wherein if it is determined in said discriminating step that the raster scanning direction of the inputted output information and that of said print mechanism are different, in said processing step, said rendering process, said rotating process, and a printing process by said print mechanism are executed in parallel on a band unit basis.

9. A computer-readable storage medium storing a computer-executable program according to claim 7, wherein said display list includes information for designating at least one of a rendering position of said object data, a rendering logic, and an image process such as rotation enlargement.

10. A print control apparatus comprising:
a forming unit for forming a display list for rendering objects into a band memory on the basis of output information which is inputted;

a rendering unit for rendering each of said objects to a bit map image into a band memory in accordance with said display list;

a discriminating unit for discriminating whether a raster scanning direction of the inputted output information and a raster scanning direction of a print mechanism are different or the same; and a processing unit for, if it is determined by said discriminating unit that the raster scanning direction of the inputted output information and that of said print mechanism are different, executing, after the bit map images are rendered by said rendering unit, a rotating process to the rendered bit map images rendered so as to be matched with the raster scanning direction of said print mechanism and transferring the rotated bit map images to said print mechanism.

11. An apparatus according to claim 10, wherein if it is determined by said discriminating unit that the raster scanning direction of the inputted output information and that of said print mechanism are different, said processing unit executes said rendering process, said rotating process, and a printing process by said print mechanism in parallel on a band unit basis.

12. An apparatus according to claim 10, wherein said display list includes information for designating at least one of a rendering position of said object data, a rendering logic, and an image process such as rotation or enlargement.

13. An apparatus according to claim 10, further comprising said print mechanism.

* * * * *

UNITED STATES PATENT AND TRADEMARK OFFICE
CERTIFICATE OF CORRECTION

PATENT NO. : 7,268,912 B2  
APPLICATION NO. : 10/364518  
DATED : September 11, 2007  
INVENTOR(S) : Murata Page 1 of 1

It is certified that error appears in the above-identified patent and that said Letters Patent is hereby corrected as shown below:

COLUMN 2:  
Line 19, "because" should read -- because of --.

COLUMN 3:  
Line 36, "an" should read -- a --.

COLUMN 5:  
Line 33, "an" should read -- a --.

COLUMN 8:  
Line 5, "rotator 703.in" should read -- rotator 703 in --.

COLUMN 9:  
Line 59, "outside." should read -- outside source. --.

COLUMN 10:  
Line 10, "magnetooptic" should read -- magneto-optic --; and  
Line 11, "an" first occurrence should read -- a --.

COLUMN 12:  
Line 30, "rotation" should read -- rotation or --.

Signed and Sealed this

Twenty-seventh Day of May, 2008

JON W. DUDAS  
*Director of the United States Patent and Trademark Office*